FIG. 1

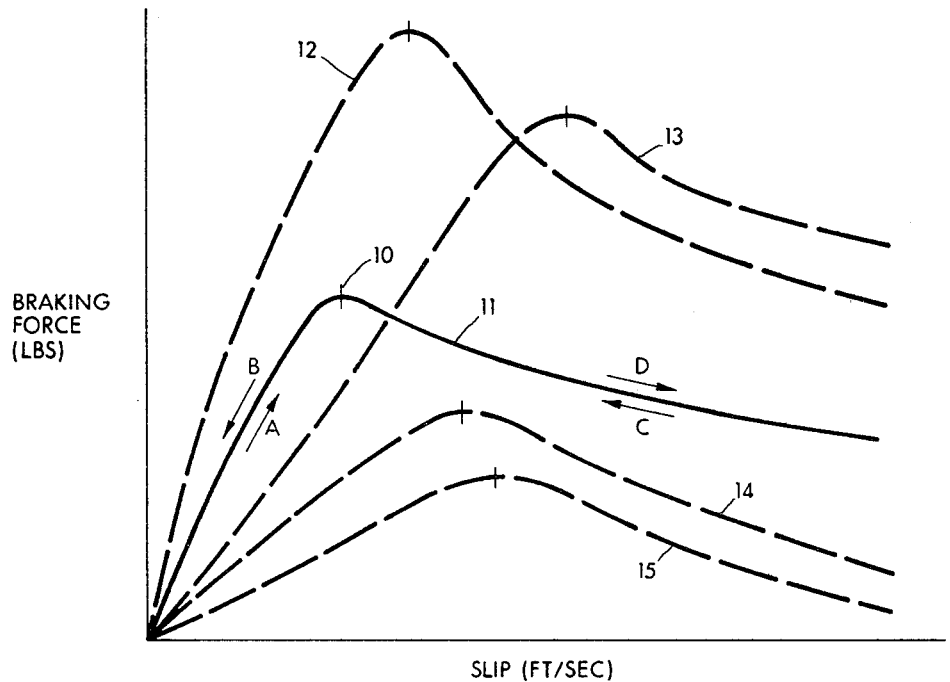

FIG. 3

| $\frac{dF}{dt}$ | $\frac{dS}{dt}$ | $\frac{dF}{dS}$ | CONDITION | BRAKING CONTROL OPERATION |
|---|---|---|---|---|
| POSITIVE | POSITIVE | POSITIVE | A | MAINTAIN BRAKING FORCE |
| NEGATIVE | NEGATIVE | POSITIVE | B | MAINTAIN BRAKING FORCE |
| POSITIVE | NEGATIVE | NEGATIVE | C | REDUCE BRAKING FORCE |
| NEGATIVE | POSITIVE | NEGATIVE | D | REDUCE BRAKING FORCE |

CHART I

INVENTOR
RONALD S. SCHARLACK
DAVID B. EISENHAURE
BY COOCH & O'CONNELL
ATTORNEYS

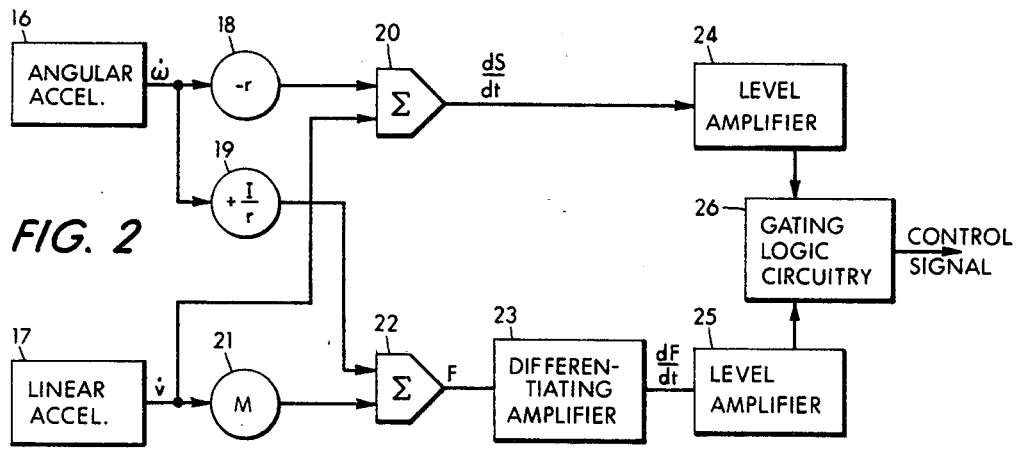
FIG. 2
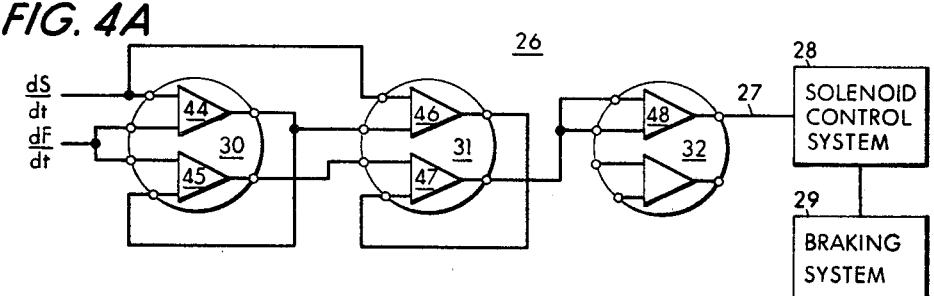
FIG. 4A
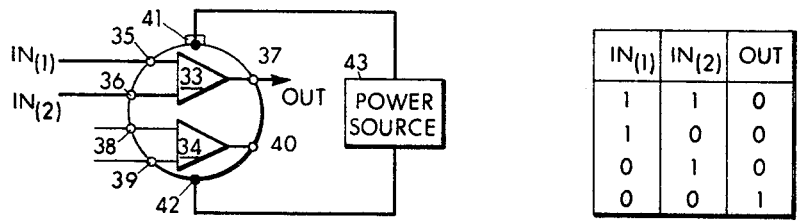
FIG. 4B
| IN(1) | IN(2) | OUT |
|---|---|---|
| 1 | 1 | 0 |
| 1 | 0 | 0 |
| 0 | 1 | 0 |
| 0 | 0 | 1 |
CHART II
FIG. 5
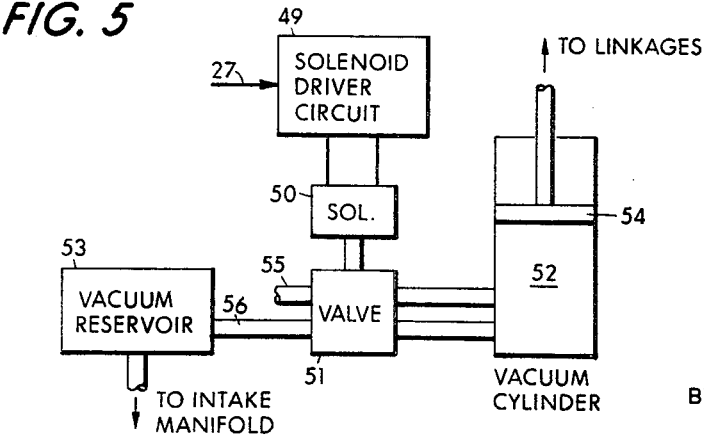
*INVENTOR*
RONALD S. SCHARLACK
DAVID B. EISENHAURE
BY
COOCH & O'CONNELL
*ATTORNEYS*

United States Patent Office 3,508,795
Patented Apr. 28, 1970

3,508,795
ANTI-SKID BRAKING SYSTEM
Ronald S. Scharlack, San Antonio, Tex., and David B. Eisenhaure, North Reading, Mass.; said Scharlack assignor, by direct and mesne assignments, to Kelsey-Hayes Company, Romulus, Mich.
Filed Mar. 28, 1967, Ser. No. 626,626
Int. Cl. B60t 8/08, 13/68
U.S. Cl. 303—21    9 Claims

ABSTRACT OF THE DISCLOSURE

A system for controlling the braking of a wheeled vehicle to prevent skidding in which the braking force applied to the vehicle wheel is effectively responsive to changes in polarity of a control signal representative of the rate of change of the braking force as a function of wheel slip so that such rate of change is maintained substantially at or near zero during the braking operation under all road conditions.

DISCLOSURE

This invention relates generally to vehicle braking systems and, more particularly, to braking control means for preventing vehicle skidding and for achieving minimum stopping distances while simultaneously maintaining drectional stability.

One of the major difficulties which arises in braking a moving vehicle, such as an automobile, an aircraft or other wheeled vehicle, occurs when the braking wheel, or wheels, "lock up" so that it becomes substantially impossible to maneuver or otherwise control the motion of the vehicle. Wheel lock-up may cause such a loss in directional stability as to result in an uncontrolled skidding or sliding while at the same time the presence of locked wheels generally increases the stopping distance required. Under most road conditions, if skidding can be prevented the vehicle can usually be stopped more safely in a shorter distance.

Braking systems for controlling skidding, as used at the present time, do not normally operate at their highest efficiencies under all road conditions and are usually set to operate at peak efficiency only under a previously specified, relatively narrow range of conditions. Consequently, the braking operation is unable to respond properly to deviations from the preselected operating condition. In relatively simple forms of prior art systems, for example, the operator is merely warned, usually visually, when wheel deceleration exceeds a certain preselected level and the operator must then manually respond to reduce brake pressure at such a time. Other more sophisticated systems automatically reduce brake pressure when excessive wheel deceleration is either partially or completely sensed.

In the more sophisticated prior art systems attempts are made to maximize efficiency in a controlled manner by reliance primarily on a preselected limited deceleration value which is based on a fixed value of the coefficient of friction. Thus, if the limiting deceleration is set at a level preselected for one condition, e.g. for dry road conditions where a maximum coefficient of friction exists, such a system does not operate efficiently under wet or slippery road conditions and may cause a loss of vehicle stability. On the other hand, if such a system is set for slippery road conditions, utilizing a minimum coefficient of friction, such system will not brake efficiently under dry road conditions since it will not allow enough deceleration to reduce the stopping distance to its optimum value.

For any particular road surface codnition, there exists essentially one angular deceleration at which the wheel will decelerate at a maximum stable rate. A deceleration below that value may increase the stopping distance considerably while decelerations above that value tend to cause wheel lock-up and its consequent directional stability problems. Even in relatively more sophisticated prior art systems wherein attempts to compute the effects of changing road conditions are made and a variable coefficient of friction is introduced into the control system, extremely complicated computer instrumentation is required and such systems do not operate at their most efficient levels under all circumstances.

The system of this invention, however, provides maximum efficiency under all road conidtions while utilizing a relatively simple computational system which takes into account the changing road conditions which result in a change in the coefficient of friction. In the system of the invention, the linear and angular accelerations of the braking wheel, or wheels, are sensed by appropriate accelerometer devices. The output signals from such accelerometers are fed to a simple analog computer system which produces output signals proportional to the rate of change of the braking force as a function of time and to the rate of change of the wheel slip as a function of time. By utilizing simple gating logic circuit elements responsive only to changes in the polarities of such output signals, a control signal can be produced and applied to the braking system of the vehicle for providing optimum operation at the most efficient performance point of the overall braking system. For maximum efficiency the system of the invention is arranged to produce a minimum rate of change of braking force as a function of slip so that ideally such rate of change is always maintained substantially at or near zero independent of the road conditions which exist.

Thus, in contrast to previously known braking systems, the braking control signal can be made responsive only to effective changes in polarity of the rate of change of braking force as a function of slip which rate of change, as discussed below, can be determined in accordance with the rates of change of the braking force and the wheel slip as functions of time. The substantial simplification of the overall instrumentation required results in reduced costs and increased ease of manufacture, assembly and maintenance in comparison with previously known systems without a corresponding reduction in the efficiency of the overall system.

The system of the invention can be explained most easily with the help of the accompanying drawings wherein:

FIG. 1 is a graph showing a family of typical performance curves depicting the change in braking force as a function of slip for varying road conditions;

FIG. 2 shows a block diagram of one particular embodiment of the control system of the invention;

FIG. 3 shows a chart useful in describing the operation of the system of the invention;

FIG. 4A shows a schematic diagram of a portion of the control system of the invention shown in FIG. 2;

FIG. 4B shows a typical logic circuit element as used in the diagram of FIG. 4A and a chart useful in describing its operation; and FIG. 5 shows a simplified diagrammatic illustration of one example of a means for controlling the braking force in response to the control signal produced by the control system of the invention.

Before describing the system of the invention, it is desirable to define certain terms which will be used herein. The terms "slip" or "slippage" refer to a characteristic of flexible rotating elements, such as rubber tired wheels, whereby such elements rotate at less than their free-rolling speed when a braking force or torque is applied. The terms "skid" or "skidding" (sometimes referred to as "slide" or "sliding") refer to a condition in which such rotating element is unable to distort sufficiently to accommodate the amount of slippage produced by the braking force and begins to slide on the contacting surface. Under skid conditions not only is vehicle control difficult to maintain but the rotating element may be subject to considerable damage.

Thus, when the wheel is said to be in a state of slip, it is not turning at its free-rolling speed and yet at the same time may not necessarily be skidding or sliding. Skidding occurs when slippage exceeds a particular value, such value depending in part on the coefficient of friction between the wheel and the contacting surface and in part upon the forces which act upon the wheels.

The graph of FIG. 1 shows a family of typical performance curves 11 through 15 for a rubber tired wheel under braking conditions, such curves representing the change in braking force F as a function of slip S under a plurality of different road conditions. Such curves are merely representative of the general shape of such performance curves and are not meant to depict any actual absolute values of force and slip for any particular wheel configurations.

With reference to FIG. 1, the braking force can be defined as the force tangential to the wheel at its contact point with the surface, which force is equal to the braking torque applied to the wheel divided by the wheel radius. The braking force is dependent upon the coefficient of friction between the wheel and the surface at the contact point between them. As can be seen in FIG. 1, each of the curves has substantially the same general shape and each has a single maximum point indicated by a short vertical line appropriately placed on each curve. With reference to the particular performance curve 11, selected for purposes of discussion, such "force-slip" curve has a single maximum point 10 at which the rate of change of the force as a function of slip, i.e., the slope $dF/dS$ of the curve, is zero. The primary purpose of the anti-skid system of this invention is to maintain the system operation about the maximum point, such as point 10 on the force-slip performance curve applicable to the particular road conditions which exist, such point being where the rate of change of braking force as a function of slip is at or substantially near zero. This operation provides a maximum braking rate and high vehicle stability. If, for example, the system is caused to operate at a point on that portion of the curve to the right of point 10, the slip S exceeds the value it has at point 10 and may tend to increase to a value where skidding will occur. If the system operating point is on that portion of the curve to the left of point 10, the braking force and, hence, the efficiency drops off rapidly and stopping distance increases considerably.

Curve 11 in FIG. 1 represents a performance curve for a specific set of road conditions (i.e., where the coefficient of friction has a specified value). Each of the other representative members of the family of curves represents operation at a different coefficient of friction in accordance with different road conditions. Since the system of the invention effectively responds to the polarity, or sign, of the quantity $dF/dS$ and not to its absolute value, as discussed below, operation can be maintained about the maximum point of whatever curve is applicable under the circumstances and the system will operate at maximum efficiency for all road conditions, that is, with reference to any one of an entire family of force-slip performance curves.

In instrumenting the system of the invention the following relations are considered in determining the braking force and slip on a particular braking wheel under consideration during operation. The braking force is determined in accordance with the following equation:

$$F = M\dot{v} + \frac{I}{r}\dot{\omega} \quad (1)$$

where F is the braking force, M is the vehicle mass, I is the wheel inertia, r is the wheel radius, v is the linear wheel velocity, $\dot{v}$ is the linear wheel acceleration, $\omega$ is the angular wheel velocity and $\dot{\omega}$ is the angular wheel acceleration.

The absolute slip S can be expressed by the following equation:

$$S = v - \omega r \quad (2)$$

Differentiating Equation 2 provides the following equation:

$$\frac{dS}{dt} = \dot{v} - \dot{\omega}r \quad (3)$$

FIG. 2 shows an analog instrumentation of Eqs. 1 and 3 as derived from measurements made by an angular accelerometer 16 and a linear accelerometer 17, each appropriately mounted on the particular braking wheel under consideration. The output signal from angular accelerometer 16 designated in the figure as $\dot{\omega}$ is fed to the input terminal of a first coefficient amplifier 18 and to the input terminal of a second coefficient amplifier 19. The output signal from linear accelerometer 17 designated in the figure as $\dot{v}$ is fed to the input terminal of a third coefficient amplifier 21 and to one input terminal of a summation amplifier 20.

The angular acceleration $\dot{\omega}$ is multiplied by a quantity equal to the negative of the wheel radius r at coefficient amplifier 18, the output of which is then fed to a second input terminal of summation amplifier 20. The output signal from summation amplifier 20 represents the rate of change of slip S as a function of time t, designated in the figure as $dS/dt$.

The angular acceleration $\dot{\omega}$ is multiplied at coefficient amplifier 19 by a quantity equal to the quotient of the wheel inertia I over the wheel radius r, the output signal from coefficient amplifier 19 then being fed to one input terminal of a second summation amplifier 22. The linear acceleration $\dot{v}$ is multiplied at coefficient amplifier 21 by a quantity equal to the mass M of the vehicle and the output of coefficient amplifier 21 is then fed to a second input terminal of summation amplifier 22. The output signal from summation amplifier 22 thereby represents the braking force F which can be differentiated in a suitable differentiating amplifier 23 to produce a signal representative of the rate of change of F as a function of time t, designated in the figure as $dF/dt$. The signals $dS/dt$ and $dF/dt$ can be set at particular appropriate magnitude levels for use in gating logic circuitry 26 by amplifiers 24 and 25, respectively, as shown. The output of circuitry 26 represents a control signal for use in controlling the operation of the wheel braking system.

If consideration is again given to curve 11 of FIG. 1, as a representative example, it can be seen that the maximum braking efficiency is obtained at point 10 and, if operation is to be maintained about that point, the control signal applied to the braking system must differ when operation occurs on that portion of the curve to the right of point 10 from that when operation occurs on that portion of the curve to the left of point 10. As can be seen in the figure, the slope $dF/dS$ of curve 11 is negative to the right of point 10 and is positive to the left of the point 10 while, as indicated above, the slope at point 10 is zero. Thus, if the polarity of the quantity $dF/dS$ (i.e., the sign of the slope of curve 11) is effectively determined, a suitable control signal can be generated to maintain braking operation at the maximum point of the fore-slip performance curve.

In operation, that portion of the curve to the left of point 10 represents operating conditions under which the braking force and the slip are either simultaneously increasing or simultaneously decreasing as functions of time (i.e., the polarity of $dF/dS$ is positive). Such operations are designated by arrows A and B, respectively, associated with that portion of curve 11.

For operation to the right of point 10 on curve 11, the braking force may be increasing as a function of time while the slip is decreasing as a function of time or such braking force may be decreasing as a function of time while the slip is increasing as a function of time. Such conditions are designated by operation in accordance with arrows C and D, respectively, on the right-hand portion of curve 11 and in either case the porality of $dF/dS$ is negative. The above operating conditions are summarized for convenience by Chart I in FIG. 3.

Since measurements of the rates of change of the braking force and of the slip as functions of time are available in the analog instrumentation of FIG. 2, it is possible in accordance with Chart I to determine whether or not the slope $dF/dS$ of the force-slip curve of FIG. 1 is negative or positive merely by determining the polarities of the signals $dF/dt$ and $dS/dt$. Such an effective determination of the polarity of $dF/dS$ can be utilized through appropriate logic circuitry to either maintain or reduce the braking pressure being applied to the braking system in accordance with the requirements shown in the last column of Chart I. Such a logic system and a braking system controlled thereby are described with reference to FIGS. 4A and 5.

In FIG. 4A, representing one embodiment of the gating logic circuit 26 of FIG. 2, the output signals $dF/dt$ and $dS/dt$ from the analog instrumentation of FIG. 2 are fed to the combination of gating logic circuit elements 30, 31 and 32 for producing a control signal 27 having a first value under operating conditions designated by arrows A and B in Chart I and having a second value under operating conditions designated by arrows C and D in the chart. Control signal 27 is then fed to a suitable solenoid control system 28 which controls the operation of a brake system 29. If output control signal 27 has a first value, a solenoid in solenoid control system 28 is caused to assume a first position wherein the brake pressure, as applied by actuation of the brake by the vehicle operator, is fully applied to the wheel brake. If output control signal 27 has a second value, such solenoid is actuated to move to a second position which causes the braking pressure applied by the vehicle operator to be reduced accordingly. If operation is on the left-hand portion of the performance curve (where the slope of the curve is positive) gating logic circuitry 26 produces a control signal which allows full brake pressure as actuated by the operator to be applied to the braking wheel under control as shown in FIG. 3. If operation is occurring on the right-hand portion of the performance curve (where the slope is negative), gating logic circuitry 26 is arranged to produce a control signal which allows the braking pressure applied by the operator to be reduced as shown in FIG. 3. In such a way the braking system operation is maintained about the maximum point of the performance curve.

In order to provide the appropriate control signal for solenoid control system 28 under each of the conditions designated by arrows A, B, C and D of Chart I, a gating logic system 26 as shown in the particular embodiment of FIG. 4A may be used.

In FIG. 4A a plurality of solid-state logic circuit elements 30, 31 and 32 are utilized. Such elements are commonly referred to as NAND/NOR elements and one example of a commercially available element of this type is designated by Model No. 914FCH as sold by Fairchild Camera and Instrument Corporation, the operation of which is discussed with reference to FIG. 4B. In such solid-state elements of the type shown in FIG. 4B, each element comprises two logic gates 33 and 34, each gate having a pair of input terminals and a single output terminal shown as input terminals 35 and 36 and output terminal 37 for gate 33 and as input terminals 38 and 39 and output terminal 40 for gate 34. Input power is applied at terminals 41 and 42 from a suitable power source 43. Each of the gates operates in acordance with Chart II in FIG. 4B. In accordance with this chart, if a positive signal (designated by the symbol 1) is present at either input terminal or at both input terminals, the output from such gate is zero (designated by the symbol 0). If, however, both inputs are simultaneously zero, the output is positive. Such gates can be controlled by negative input signals as well as zero input signals, if appropriate circuitry is used to convert such negative signals to zero signals (e.g., a simple diode element which maintains such negative signals at a zero value). Thus, the gates can be effectively controlled by positive and nonpositive (i.e., zero or negative) signals.

Each of the gates in the logic circuitry formed by elements 30, 31 and 32 operates in accordance with the required operation discussed with reference to Chart II. A signal representing $dF/dt$ is fed into a first input terminal of each of gates 44 and 45 of logic element 30 while a signal representing $dS/dt$ is fed to the second input terminal of gate 44 of logic element 30 and a first input terminal of gate 46 of logic element 31. The output from gate 44 is simultaneously fed to the second input terminal of gate 45 and to the second input terminal of gate 46, while the output from gate 45 is fed to a first input terminal of gate 47. The output from gate 46 is fed to the second input terminal of gate 47, while the output from gate 47 is fed simultaneously to both input terminals of gate 48. Control signal 27 is produced at the output terminal of gate 48.

If $dF/dt$ and $dS/dt$ are of like sign (both are positive or both are negative) so that the effective polarity of $dF/dS$ is positive, control signal 27 is zero. If $dF/dt$ and $dS/dt$ are of unlike sign (one is positive while the other is negative) so that the effective polarity of $dF/dS$ is negative, control signal 27 is positive.

Control of the braking pressure in response to control signal 27 is provided by solenoid control system 28 which controls the operation of braking system 29. A typical simplified embodiment of such a solenoid control system is shown in FIG. 5, it being understood that such embodiment represents only one method for controlling the braking pressure applied by the vehicle operator to the braking wheel. In FIG. 5 a solenoid driver circuit 49 is used to control the actuation of a solenoid 50, the shaft of which actuates a valve 51. Valve 51 is arranged to reduce the pressure within vacuum cylinder 52 by connecting such cylinder to vacuum reservoir 53 via line 56 when the solenoid is actuated, i.e., when control signal 27 is positive. The pressure in vacuum cylinder 52 is thereby reduced to cause movement of the piston 54 in a downward direction to provide a counter force, through suitable linkages, to the braking force being applied by the operator to vehicle wheel brake. When solenoid 50 is in its unactuated position, i.e., when control signal 27 is zero, vacuum cylinder 52 is opened to the atmosphere through line 55 so that no counter force is applied to the braking force produced by the vehicle operator and full braking force is maintained at the wheel.

In this way, operation of the overall system is maintained about the maximum points on the force-slip performance curves of FIG. 1. Since the system operates solely on the effective polarity of $dF/dS$ as derived from polarities of the signals $dF/dt$ and $dS/dt$ rather than on the specific magnitudes or absolute measured or computed values of such signals, the system becomes applicable for all road conditions and automatically operates at the maximum point of whatever curve in the overall family of typical performance curves shown in FIG. 1 applies to the particular environmental conditions involved.

Other alternative embodiments of particular portions of the system utilizing the basic concepts of the invention may occur to those skilled in the art. For example, other conventional NAND-gate and NOR-gate circuits utilizing transistor and diode elements coupled with suitable resistance and capacitance elements may be utilized as a substitute for the solid-state logic elements shown in FIG. 4A. Other systems, such as compressed air systems, or pressure bleeding systems, for changing the braking force in response to the operation of the braking control system, of the invention may also be used in place of the pneumatic vacuum cylinder system shown in the specific embodiments discussed above.

What is claimed is:

1. A system for providing a braking operation for a vehicle comprising
   means for applying a braking force to at least one braking wheel of said vehicle;
   means for producing a control signal solely in response to a representation of the change in polarity substantially of the rate of change of the braking force on said braking wheel as a function of the slip of said wheel; and
   means adapted to be made operative during the braking operation for changing the braking force applied to said braking wheel solely in direct response to said control signal so that said rate of change tends to be maintained substantially at zero.

2. A system for braking a vehicle in accordance with claim 1 wherein said control signal producing means includes
   means for producing a first signal representing the rate of change of the braking force on said braking wheel as a function of time and a second signal representing the rate of change of the slip of said braking wheel as a function of time; and
   means responsive to said first and second signals for producing said control signal.

3. A system for braking a vehicle in accordance with claim 2 wherein said first and said second signal producing means includes
   means for measuring the angular and linear accelerations of said braking wheel; and
   means responsive to said angular and linear accelerations for producing said first and said second signals.

4. A system for braking a vehicle comprising
   means for applying a braking force to at least one braking wheel of said vehicle;
   means for measuring the angular acceleration of said wheel;
   means for measuring the linear acceleration of said wheel;
   means responsive to said angular and said linear acceleration measurements for producing a first signal representing the rate of change in braking force on said wheel as a function of time and for producing a second signal representing the rate of change in the slip of said wheel as a function of time;
   logic means responsive to said first and said second signals for producing a control signal having a first value when said first and said second signals have different polarities and for producing a control signal having a second value when said first and said second signals have the same polarity; and
   solenoid control means responsive to said control signal from said logic means for reducing the magnitude of the braking force being applied to said wheel when said control signal has said first value and for maintaining the magnitude of the braking force being applied to said wheel when said control signal has said second value.

5. A system for braking a vehicle in accordance with claim 4 wherein said logic means includes a plurality of solid state gating elements each having two input terminals and one output terminal and each of said gating elements providing a positive output signal at said output terminal only when the input signals at said input terminals are both negative or zero.

6. A system for braking a vehicle in accordance with claim 4 wherein said logic means includes five solid state gating elements;
   said first and said second signals being applied to the input terminals of said first gating element;
   said second signal and the output signal from said first gating element being applied to the input terminals of said second gating element;
   said first signal and the output signal from said first gating element being applied to the input terminals of said third gating element;
   the output signals from said second gating element and from said third gating element being applied to the input terminals of said fourth gating element; and
   the output signal from said fourth gating element being applied to both input terminals of said fifth gating element whereby said fifth gating element produces said control signal at its output terminal.

7. A system for braking a vehicle in accordance with claim 4 wherein said solenoid control means includes
   a vacuum cylinder system for controlling the braking force applied to said braking wheel;
   valve means for controlling the operation of said vacuum cylinder; and
   solenoid means for actuating said valve means in response to the polarities of said first and second signals.

8. A system for braking a vehicle in accordance with claim 1, wherein said braking force changing means releases said braking force in direct response to said control signal.

9. A system for braking a vehicle in accordance with claim 1, wherein said braking force changing means applies said braking force in direct response to said control signal.

References Cited

UNITED STATES PATENTS

| | | |
|---|---|---|
| 3,362,757 | 1/1968 | Marcheron. |
| 3,398,995 | 8/1968 | Martin _____ 303—20 X |
| 2,788,186 | 4/1957 | Wilson. |
| 3,022,114 | 2/1962 | Sampietro. |
| 3,235,036 | 2/1966 | Meyer et al. |
| 3,288,232 | 11/1966 | Shepherd. |
| 3,301,608 | 1/1967 | Harned et al. |

DUANE A. REGER, Primary Examiner

U.S. Cl. X.R.

303—20